United States Patent Office 3,125,572
Patented Mar. 17, 1964

3,125,572
MORPHOLINE COMPOUNDS SUBSTITUTED IN 2,3-POSITIONS AND 2,3,6-POSITIONS RESPECTIVELY, AND PROCESS FOR PREPARING THE SAME
Harm Siemer, Konstanz, and Adolf Doppstadt, Konstanz-Litzelstetten, Germany, assignors to Ravensberg G.m.b.H., Chemische Fabrik, Konstanz, Germany
No Drawing. Filed July 23, 1958, Ser. No. 750,313
2 Claims. (Cl. 260—247)

This invention relates generally to racemic and optically active, multi-substituted morpholines and a process for their preparation and is particularly directed to the preparation of morpholines of the kind referred to, wherein the substituents in 2,3-position exhibit a threo configuration relative to each other.

Considered from a different aspect, the invention is also concerned with a novel process for the preparation of intermediary compounds useful for the production of morpholines.

The morpholines with which the present invention is concerned correspond to the general Formula I

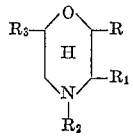

wherein R stands for phenyl or cyclohexyl, $R_1$ stands for lower alkyl and $R_2$ and $R_3$ represent hydrogen or a lower alkyl group.

In accordance with prior art processes, morpholines are generally prepared by dehydrating correspondingly substituted diethyl-aminodiols by means of f. ex. concentrated or 70% sulfuric acid at room temperature or at elevated temperature. These processes are time-consuming since the dehydration proceeds slowly. Further, considerable quantities of sulfuric acid are required. For example, for obtaining a morpholine ring closure with 10 grams of β-phenyl-α-methyl-β,β'-dihydroxy-diethylamine-hydrochloride, 30 grams of concentrated sulfuric acid are required (see British Patent 773,780, Examples 1 and 2). The presence of large amounts of sulfuric acid is of course most disadvantageous for the further processing of the reaction mixture. Extensive and cumbersome measures have to be adopted in order to work up the acidic reaction solutions. The excess acid has to be neutralized with considerable quantities of alkali so as to render it possible to recover the morpholine, i.e. to dissolve the base in ether. The very considerable neutralization heat developing during the neutralization referred to makes it furthermore necessary to add ice to or otherwise effectively to cool the reaction mixture so as to prevent the formation of decomposition products.

If 48% hydrobromic acid is used as dehydrating agent, likewise a large excess of acid has to be employed (see German patent application B 37 373 IB b/12p), while finally the excess acid has to be removed by a relatively protracted distillation procedure. For pharmacological reasons it is furthermore preferable, if not imperative, to convert the hydrobromide obtained by the above described procedure into a different salt, as for example 2-phenyl - 3-methyl-morpholine-hydrochloride, for which purpose the free base has to be specially prepared.

In the preparation of morpholines the chemical structure of the aminodiols is of considerable importance for a successful course and performance of the ring closing reaction. If, for example, it should be attempted to split off water from β-phenyl-α-methyl-β,β'-dihydroxy-diethylbenzylamine-hydrochloride by means of concentrated sulfuric acid or 48% hydrobromic acid at room or elevated temperature, under no circumstances will the corresponding 2-phenyl-3-methyl-4-benzyl-morpholine be obtained. It is likewise not possible to obtain 2-phenyl-3-methylmorpholine in a satisfactory yield from β-phenyl-α-methyl-β,β'-dihydroxy-diethylamine-hydrochloride in the presence of concentrated sulfuric acid at elevated temperature, such as for example 160° C. In this connection reference is had to the German patent application B 24932 IVb/12p where a statement appears which in English translation reads as follows: "In the preparation of substituted morpholines, it is, however, necessary to seek particularly mild reaction conditions. The reason for this is that there is a danger that undesired side reactions may occur which may be evoked by the influence of the temperature or the acid used for effecting the ring closure."

It is a primary object of the present invention to provide an improved process for the preparation of substituted morpholines of the kind referred to which overcomes the disadvantages of the prior art processes using acid as dehydrating medium.

A further object of our invention is the provision of novel useful substituted morpholines.

Considered from another aspect, our invention has as its object to provide a process for the preparation of intermediaries useful for the preparation of substituted morpholines of the kind referred to.

Still another object of the invention is to provide a one-step process for the preparation of substituted morpholines of the kind referred to which includes as an integral part of the process the preparation of intermediaries used for forming the morpholines.

In accordance with this invention we have found that aminodiol salts of the general Formula II

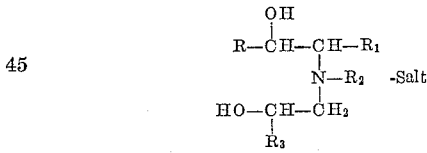

wherein R, $R_1$, $R_2$ and $R_3$ have the meaning given in Formula I above, may be successfully converted into the corresponding morpholines with excellent yields even at relatively high reaction temperatures in the presence of anhydrous zinc chloride, while removing the formed reaction water by distillation. We have ascertained that the ring closing reaction of the compounds of Formula II to yield the desired morpholines may be effected at relatively high temperatures, of for example about 210° C. and that the reaction proceeds under practically catalytic reaction conditions.

We have, furthermore, ascertained that the hydrochlorides of the aminodiols of Formula II lend themselves particularly well to the reaction.

The morpholine base formed by the reaction may be directly expelled or driven off from the reaction melt upon the addition of an alkali. It is also feasible first to dissolve the base in ether whereafter it is recovered by fractional distillation.

It should be noted that surprisingly both the erythro and the threo aminodiol salts of Formula II yield in accordance with the inventive process morpholines whose 2,3 substituents exhibit a threo configuration. If optically active aminodiol salts are employed, the morpholines obtained by the reaction rotate surprisingly the plane of polarized light in a direction opposite to that of the starting compounds, in other words levorotatory aminodiols yield dextrorotatory morpholines and vice versa.

The ring closing process of the present invention has furthermore certain noteworthy characteristics: For example, the ring closure can be successfully carried out with the salts, e.g. the hydrochlorides, of the aminodiols only. If it is attempted to employ the free aminodiol bases, no ring closure takes place. On the other hand it is not feasible economically to carry out the ring closure with the aminodiol salts alone, i.e. without addition of zinc chloride. If this latter procedure is attempted, i.e. if the aminodiol salts are subjected to a heat treatment in the absence of zinc chloride, an extremely poor yield of morpholines is obtained, if they are obtained at all. In order to obtain good results about 20-40% zinc chloride should be used.

The present invention furthermore encompasses a simple and economically exceedingly advantageous one-step process for the preparation of certain morpholines of Formula I, which includes both the preparation of the aminodiol-salts of Formula II as an intermediary stage, without, however, requiring the separation of these aminodiol-salts, and the subsequent ring closing procedure according to the invention to form the desired substituted morpholines. This one-step process, moreover, includes the preparation of stable 1,4-dioxane compounds which, if desired, may be separated and stored for future use. The morpholines prepared by this one-step process will generally correspond to the Formula III.

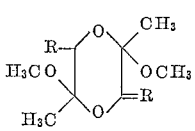

wherein R stands for phenyl or cyclohexyl, and $R_3$ is hydrogen or a lower alkyl group.

In preparing the substituted morpholines according to the inventive one-step process, acetylene alcohols of the general Formula IV $$R-\overset{OH}{\underset{}{C}H}-C\equiv CH$$

wherein R stands for phenyl or cyclohexyl, are first converted by means of red mercuric oxide and borontrifluoride in methyl alcohol solution into the corresponding 1,4-dioxane compound of Formula V

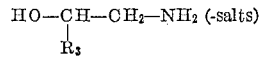

The 1,4-dioxane compound is then directly, i.e. without prior isolation, split by an acid, advantageously by aqueous hydrochloric acid whereby racemic 1-R-propanol-(1)-on-2 is obtained. The ketol thus obtained is washed neutral and is thereafter hydrogenated in aminating manner in the presence of amino alcohol salts, preferably the hydrochlorides, of the general Formula VI $$HO-\underset{R_3}{\overset{}{C}H}-CH_2-NH_2 \text{ (-salts)}$$

wherein $R_3$ sands for hydrogen or lower alkyl. The hydrogenation of the split product referred to may, for example, be carried out catalytically with Raney nickel at a hydrogen excess pressure of about 100 atmospheres and at a temperature of about 70–100° C. The solution thus obtained, if desired upon separation of the catalyst, is then concentrated by evaporation and the crystalline residue is heated to about 210° C. in the presence of a small amount of zinc chloride, whereby the reaction water distils off. The one-step process so far described proceeds according to the following formulas:

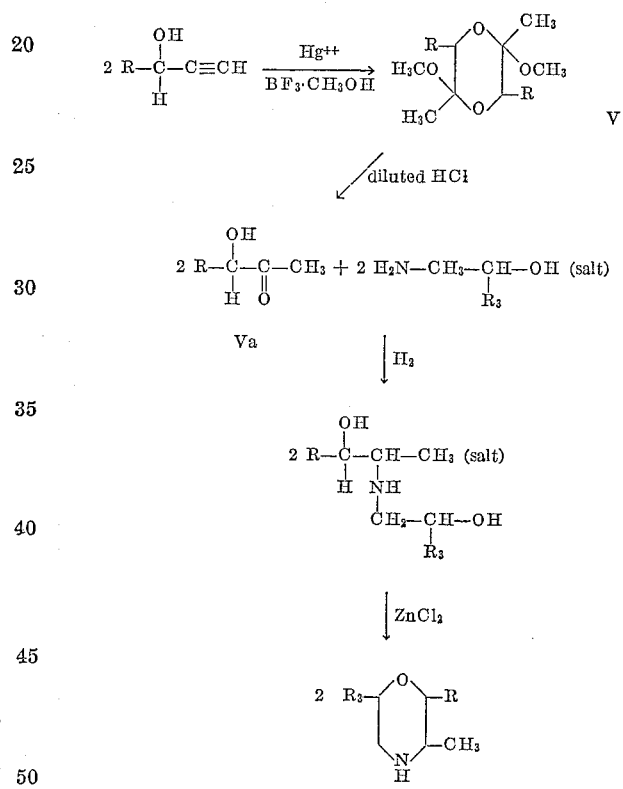

It is also feasible slowly to heat the hydrogenation solution directly to about 210° C. after the addition of the zinc chloride, whereby both the methyl alcohol and the reaction water distil off. The reaction mass is cooled upon the removal of the entire quantity of reaction water and the still warm melt is made alkaline by the addition of suitable alkali f.ex. an alkali metal hydroxide whereafter the morpholine is expelled by fractional distillation under reduced pressure.

The last step described, i.e. the recovery of the morpholine may also be effected by extracting the alkaline phase with ether, whereafter the ethereal solution is subjected to fractional distillation, whereby the substituted morpholines are obtained. It is, of course, also feasible to prepare the morpholine hydrochloride from the ethereal phase by, for example adding a solution of hydrochloric acid in methyl alcohol.

If sulfuric acid is to be used as dehydration agent so as to accomplish the ring closure without anhydrous zinc chloride, concentrated sulfuric acid is added to the concentrated hydrogenation solution referred to, whereafter this reaction mixture is heated for about one hour to 100° C. The reaction mixture is subsequently cooled, placed on ice and made alkaline, whereafter the morpholine formed is taken up in ether. The morpholine is then recovered from the ether phase by fractional distillation in vacuo. If diluted sulfuric acid is employed for the dehydration, i.e. for example sulfuric acid of 70% concentration, a heating to a temperature of about 160° C. is required. For the previously mentioned reasons, the use of either concentrated or diluted sulfuric acid instead of anhydrous zinc chloride for effecting the ring closure is, however, considerably less advantageous.

One of the prerequisites for an economic performance of the one-step process in accordance with our invention is the exceedingly simple and favorable preparation of the 1,4-dioxane. The preparation of 1,4-dioxanes, for example of 2,5-dimethyl-2,5-dimethoxy-3,6-diphenyl-1,4-dioxane, is known per se and has been described in the literature (see f.ex. Journal of the American Chemical Society, v. 64 (1942), pages 1220-1222). According to this latter publication, 1-phenyl-propine-2-ol-(1) is added to a solution of a catalyst in methanol, which solution has been heated to 45° C. The catalyst consists of red mercuric oxide, boron tri-fluoride etherate, some crystals of trichloroacetic acid and methanol and requires a special preparation by a heat treatment. The methanol has to be distilled off upon completion of the reaction, while the residue has to be crystallized from nitrobenzene or pyridine. In spite of the fact that a specially prepared catalyst is employed, the yield mentioned in this publication is only 36% of the theory. In contrast to the teachings of this publication, we have surprisingly ascertained that 2,5-dimethyl-2,5-dimethoxy-3,6-diphenyl-1,4-dioxane may be obtained with an excellent yield (97% of the theory) by dissolving red mercuric oxide in a solution of $BF_3$ in methyl alcohol of 50% concentration, and without prior heating, adding thereto a 50% solution of 1-phenyl-propine-2-ol-(1) in methanol in such manner and at such a rate that the reaction mixture starts boiling on its own, i.e. without applying external heat. The reaction may be maintained at the boiling point by adding small amounts of a solution of red mercuric oxide dissolved in methyl alcohol-boron tri-fluoride.

A further noteworthy characteristic of our process resides in the fact that no crystalline dioxane compound is obtained if the acetylene alcohol alone is added to a 50% $HgO/BF_3$-catalyst methyl alcohol solution. Further, if different acetylene alcohols, such as for example ethinyl-1-cyclohexanol or 1,1-dimethyl-ethinyl-carbinol-(1) are employed, the 1,4-dioxane derivatives are not formed at all or only in insignificant amounts. Oily, mostly unsaturated products are predominantly obtained instead.

A further important prerequisite for the inventive one-step process is that the intermediary compound obtained by the splitting of the 1,4-dioxane compound, i.e. the racemic 1-R-propanol-(1)-on-2 is formed in yields of about 90%. If it is attempted to prepare this ketol directly in accordance with known processes, for example from 1-phenyl-propine-2-ol-(1), then the formation of undesirable byproducts to a considerable extent is unavoidable. In this connection reference is had to the research of Faworski and Temnikowa (Chem. zentralblatt 2 (1953), p. 262) who by the reaction of this acetylene alcohol with $HgSO_4$ obtained but 25% of ketol.

From the above explanations it will be readily realized that considerable process-technical difficulties and prejudices had to be overcome in order to render possible the prerequisites required for successfully and economically carrying out the inventive one-step process. The final result, i.e. to obtain substituted morpholines of the kind referred to in a one-step process from acetylene carbinols or the dioxane compound, respectively, while using anhydrous zinc chloride as dehydration medium could certainly not be anticipated and consequently the reaction course should be considered as most surprising and remarkable.

Particularly with regard to the novel ring closing process requiring but a short reaction time, the inventive procedure constitutes an important step forward in the art under consideration, since known processes have been simplified, and existing apparatus may be put to more functional use, while the output of such apparatus may be considerably increased.

The simple preparation of the 1,4-dioxane compounds in accordance with the inventive process is of great importance from a production point of view, since these compounds, contrary to the acetylene carbinols and the propanolones, are chemically stable and thus may be stored for long periods without decomposing.

It should also be emphasized that the preparation of the aminodiol salts, f. ex. erythro-1-phenyl-2-oxyethyl-aminopropanol-(1), which are obtained in their erythro form as intermediaries in the course of the hydrogenation, is particularly favorable. According to the state of the art the preparation of these compounds required the reaction of bromine propiophenone with benzylethanolamine. This prior art procedure is most disadvantageous, because on the one hand the reaction results in a very poor yield while on the other hand bromine propiophenone is handled with great difficulties only since it has unpleasant physiological effects. Further, the required subsequent hydrogenation with noble metal catalysts has to be effected, advantageously with the hydrochloride of the 1-phenyl-1-oxo-2-benzyl-ethanol-aminopropane obtained, which of course requires a further process step while, furthermore, the benzyl group has to be removed by hydrogenation.

The morpholines obtained by the inventive process, particularly in the form of their salts, constitute very valuable medicines. Some of these morpholines are novel compounds. They exhibit a marked psycho-stimulating and appetite reducing effect. The morpholines that are substituted in 2,3-position, as for example 2-phenyl-3-methyl-morpholine and 2-cyclohexyl-3-methyl-morpholine have a most marked anti-depressive action. The threo and particularly the optically active, dextrorotary compounds are in all instances far superior to the corresponding racemic morpholines. Particularly important from the medical point of view are the 8-chlorotheophylline derivatives that have been prepared with the substituted morpholines of the present invention, as for example 2-phenyl - 3 - methyl - morpholine - 8 - chlorotheophyllinate. These latter compounds when administered to human beings do not cause any significant undesirable blood pressure increase. These last mentioned derivatives may be prepared in a simple manner by simply dissolving the morpholines of this invention in a small amount of acetone, whereupon the slurry thus obtained is triturated with an equimolar amount of 8-chlorotheophylline. The 8-chlorotheophylline compounds are then obtained practically quantitatively as solid substances.

The invention will now be described by several examples. It should be understood, however, that these examples are given by way of illustration rather than by way of limitation and that many changes may be made in, for example, quantities, choice of starting materials, temperatures and process conditions in general, without departing in any way from the spirit and scope of the invention as recited in the appended claims.

EXAMPLE 1

*Preparation of 2-Phenyl-3-Methyl-Morpholine*

30 grams of threo-1-phenyl-2-hydroxyethylaminopropanol-(1)-hydrochloride are mixed with 10 grams of anhydrous zinc chloride and the mixture is heated to 225° C. After the reaction water has distilled off, the residual still warm reaction melt is made alkaline with a 30% sodium hydroxide solution. The reaction product settles very well and is separated with ether. The ether solution is then dried and concentrated by evaporation. The residue is distilled at 102° C. and a pressure of 2.5 mm.

Hg. The 2-phenyl-3-methyl-morpholine-hydrochloride obtained therefrom has a melting point of 176° C. (recrystallized from isopropyl alcohol). The yield is 84%.

EXAMPLE 2

*Preparation of Levorotatory 2-Phenyl-3,4-Dimethylmorpholine*

25 grams of dextrorotatory 1-phenyl-2-hydroxyethyl-methylamino-propanol-(1)-hydrochloride are mixed with 10 grams of anhydrous zinc chloride. The dehydration is effected at 220° C. The further processing is carried out as described in Example 1. Levorotatory 2-phenyl-3,4-dimethyl-morpholine base, $[\alpha]_D^{18} = -30.2°$, is obtained.

This compound is then triturated with 8-chlorotheophylline in the presence of a small amount of acetone. The (—)-2-phenyl-3,4-dimethyl-morpholine-8-chlorotheophyllinate obtained had a rotation of $[\alpha]_D^{18} = -16.8°$.

EXAMPLE 3

*Preparation of Dextrorotatory 2-Phenyl-3-Methyl-Morpholine*

30 grams of levorotatory 1-phenyl-2-hydroxyethyl-amino-propanol-(1)-hydrochloride are dehydrated in the presence of 10 grams of anhydrous zinc chloride as described in Example 1. The further working up is also effected in accordance with Example 1. The resulting dextrorotatory 2-phenyl-3-methyl-morpholine base distils at 94° C. at 1.2 mm. Hg. The hydrochloride which is prepared with hydrochloric acid in methanol and with ether melts at 201° C., $[\alpha]_D^{18} = +24.4°$ (recrystallized from isopropyl alcohol). The yield was 83%.

EXAMPLE 4

*Preparation of 2-Phenyl-3,6-Dimethyl-Morpholine*

30 grams of 1-phenyl-2-isopropanolamino-propanol-(1)-HCl are worked up in accordance with the procedure of Example 1. 2-phenyl-3,6-dimethyl-morpholine base is obtained in a yield of 68%. It distills at B.P. 118°–120° C. at 1.5 mm. Hg.

EXAMPLE 5

*Preparation of 2-Phenyl-3-Methyl-Morpholine by One-Step Process*

80.5 grams of 1-phenyl-propine-2-ol-(1), are dissolved in 80 ml. of methanol. This solution is added to a colorless solution comprising 1 gram of mercuric oxide, 20 ml. solution of 50% borontrifluoride in methanol and 200 ml. of methanol. The rate of addition is maintained in such a manner that the resulting reaction mixture starts boiling.

A crystalline separation sets in after the addition of about 25 ml. of the phenylpropinol solution. Finally the still boiling reaction mixture is twice admixed with 3 ml. of catalyst solution (2 grams of HgO dissolved in 25 ml. of 50% borontrifluoride in methanol and 30 ml. methanol), whereby a spontaneous crystallization of the 2,5-dimethyl-2,5-dimethoxy-3,6-diphenyl-1,4-dioxane sets in under a strongly exothermic reaction and the paste- or slurry-like reaction, mixture solidifies to a solid mass. 40 ml. of concentrated HCl and 50 ml. of water are then added and the mixture is heated to boiling under stirring until the splitting of the dioxane is complete. The somewhat oily readily separating split product is then washed with a diluted sodium carbonate solution, whereafter 100 ml. of methanol are added. Thereafter the hydrogenation is effected in the presence of 49 grams of 2-amino ethanol-(1)-HCl and 6 ml. of Raney-nickel at a temperature of 80–90° C. and a hydrogen excess pressure of 110 atmospheres. Upon completion of the hydrogen absorption, anhydrous zinc chloride is added to the reaction solution, whereafter the solution is gradually heated to 210° C. in the course of about 45 minutes. In doing so, the methanol distills off first, followed by the reaction water. The still warm reaction melt is then made alkaline with 30% sodium hydroxide solution and the reaction product is taken up in ether. The ether phase is dried by means of caustic soda and then concentrated by evaporation. The 2-phenyl-3-methyl-morpholine base distils at B.P. 98° C. at 2 mm. Hg.

The hydrochloride may be prepared from the morpholine base by known processes. This hydrochloride has a melting point of 176° C. The yield is 78%.

To produce another salt which is very effective in pharmaceutical use 88.5 grams of 2-phenyl-3-methylmorpholine are solved in 100 ml. of acetone whereafter 107.5 grams of 8-chlorotheophylline are added. The 2-phenyl-3-methyl-4-(8-chlorotheophylline)-morpholine crystallizes within a short time in a quantitative yield (melting point at 128–132° C. after recrystallization).

EXAMPLE 6

*Preparation of 2-Phenyl-3-Methyl Morpholine*

45 grams of 2,5-dimethyl-2,5-dimethoxy-3,6-diphenyl-1,4-dioxane, which may be obtained according to the procedure of Example 5, are split in the presence of 20 ml. of concentrated HCl and 25 ml. of water at boiling temperature. The split product is washed with water and is admixed with 50 ml. of methanol. The hydrogenation is effected in the presence of 25 grams of 2-amino-ethanol-(1)-hydrochloride and 5 ml. of Raney-nickel. The catalyst is removed by centrifuging upon completion of the hydrogen absorption, whereafter the solution is concentrated. The crystalline residue thus obtained is admixed with anhydrous zinc chloride and is heated to about 210° C. In accordance with Example 5, 2-phenyl-3-methyl-morpholine is obtained, the hydrochloride of which melts at 176° C. Yield=83%.

EXAMPLE 7

*Preparation of 2-Cyclohexyl-3-Methyl-Morpholine*

In accordance with the procedure of Example 6, 86 grams of 2,5-dimethyl-dimethoxy-3,6-dicyclohexyl-1,4-dioxane are first split and thereafter hydrogenated so as to introduce an amine-group, in the presence of 46 grams of 1-amino-ethanol-2-hydrochloride. The hydrogenation product is then dehydrated as described in the preceding examples.

The morpholine base is obtained in the form of a colorless, slightly viscous oil. The 2-cyclohexyl-3-methylmorpholine-hydrochloride prepared therefrom melts at 202° C. (recrystallized from isopropylalcohol).

EXAMPLE 8

*Preparation of 2-Phenyl-3-Propyl-Morpholine*

20 grams of 1-phenyl-1-hydroxy-2-hydroxyethyl-amino-pentane-hydrochloride are heated in the presence of 8 grams of dehydrated zinc chloride to 225° C. The reaction water distills off, whereafter the still warm reaction mass is made alkaline with a diluted NaOH-solution. The morpholine base is then taken up in ether. The dried ether solution is thereafter concentrated and the residue is distilled at B.P.=105° C. at 0.5 mm. Hg. The 2-phenyl-3-propyl-morpholine-hydrochloride which is prepared with the aid of ether and HCl in methanol, has a melting point of 139° C. The yield is 76% of the theory.

What is claimed is:
1. 2-cyclohexyl-3-methylmorpholine.
2. As a chemical compound the 8-chlorotheophyllinate of 2-cyclohexyl-3-methylmorpholine.

References Cited in the file of this patent

UNITED STATES PATENTS 2,256,434  Klavehn et al. _____ Sept. 16, 1941

(Other references on following page)

UNITED STATES PATENTS

| | | | |
|---|---|---|---|
| 2,835,669 | Thomas | | May 20, 1958 |
| 3,010,965 | Elpern | | Nov. 28, 1961 |

FOREIGN PATENTS

| | | | |
|---|---|---|---|
| 844,006 | Germany | | July 14, 1952 |
| 37,373 | Germany | | Feb. 9, 1956 |
| 773,780 | Great Britain | | May 1, 1957 |
| 791,416 | Great Britain | | Mar. 5, 1958 |

OTHER REFERENCES

Kohn: Deutsche Chemische Gesellschaft (Berichte) vol. 49, page 250 (1916).

Kao et al.: Chemical Abstracts, vol. 31, pages 6189 and 6190 (1937); abstracted from: The Science Reports of the National Tsing Hua University, Ser. A, vol. 4, pages 35–39 (1937).

Froning et al.: J.A.C.S. vol. 62, pages 653–55 (1940).

Hennion et al.: Journal of the American Chemical Society vol. 64, pages 1220–1222 (1942).

Karrer Organic Chemistry (Text) 2nd edition, pages 92–102 (1946).

Royals: Advanced Organic Chemistry (Textbook), (Second printing, 1956), pages 240 and 241.

Elderfield: Heterocyclic Compounds (Textbook) vol. 6 pages 26 and 27 (1957 Edition); John Wiley and Sons, Inc., N.Y.

Hengen, Arzneimittel-Forschung, vol. 7; pages 461–464 (1957) RS 1 A8.

Gilman et al.: J.A.C.S., vol. 73, page 4030.